United States Patent [19]

Graf

[11] Patent Number: 5,409,084
[45] Date of Patent: Apr. 25, 1995

[54] AUTOMATIC LUBRICANT DISPENSER

[75] Inventor: Walter Graf, Euerdorf, Germany

[73] Assignee: Satzinger GmbH & Co., Euerdorf, Germany

[21] Appl. No.: 264,479

[22] Filed: Jun. 23, 1994

Related U.S. Application Data

[63] Continuation of Ser. No. 33,630, Mar. 16, 1993.

[30] Foreign Application Priority Data

Mar. 26, 1992 [DE] Germany .................. 42 09 776.2

[51] Int. Cl.⁶ ............................................. F16N 11/10
[52] U.S. Cl. ................................. 184/39; 184/108; 222/389; 222/399
[58] Field of Search ............... 184/39, 108; 222/389, 222/399

[56] References Cited

U.S. PATENT DOCUMENTS

| | | | |
|---|---|---|---|
| 3,430,731 | 3/1969 | Satzinger | 184/39 |
| 3,842,939 | 10/1974 | Satzinger | 184/39 |
| 4,671,386 | 6/1987 | Orlitzky | 184/39 |
| 4,744,442 | 5/1988 | Bras et al. | 184/39 |
| 5,012,897 | 5/1991 | Jorissen | 184/39 |

FOREIGN PATENT DOCUMENTS

| | | | |
|---|---|---|---|
| 3811469 | 10/1989 | Germany | 184/39 |
| 3718341 | 1/1991 | Germany | 184/39 |

Primary Examiner—Edward K. Look
Assistant Examiner—Christopher Verdier
Attorney, Agent, or Firm—Herbert Dubno; Andrew Wilford

[57] ABSTRACT

An automatic pressurizable lubricant dispenser has a vessel adapted to hold a supply of a fluent lubricant and having one side formed with an outlet adapted to be connected via a conduit to a machine to be lubricated and another open side and a cover engaged over the other side and fitted with a cap fittable snugly like a piston in the vessel and forming with the cover a substantially closed compartment holding a supply of a reactive liquid. The cover is formed with a seat opening into the compartment. A gas-generating cartridge fits into the seat and has an element capable of reacting with the liquid and forming a gas. A removable partition closes the seat and segregates it from the liquid-holding compartment. The cartridge is constructed so as to remove the partition and contact the element with the liquid for generating gas in the compartment and forcing the cap like a piston away from the cover into the vessel to pressurize the fluent lubricant therein.

16 Claims, 5 Drawing Sheets ions 5,409,084

AUTOMATIC LUBRICANT DISPENSER

CROSS REFERENCE TO RELATED APPLICATION

This application is a continuation of copending application Ser. No. 08/033,630 filed 16 Mar. 1993 with a claim to the priority of German application P 42 09 776.2 filed 26 Mar. 1992.

FIELD OF THE INVENTION

The present invention relates to an automatic lubricant dispenser. More particularly this invention concerns a device which automatically dispenses a liquid lubricant under pressure.

BACKGROUND OF THE INVENTION

It is known to provide a piece of machinery with an automatic lubricant dispenser that is pressurized to force a fluent lubricant, normally an oil or grease, along a conduit into a part, typically a bearing, of the machine. In order to avoid having to provide a pump it has been suggested to provide a gas-generating cell which pressurizes the lubricant by means of a chemical reaction that can be initiated by the user when the dispenser is connected to the machine, and that generates sufficient gas to deplete the entire supply of lubricant in the dispenser.

In German patent 3,718,341 filed 01 Jun. 1987 by B. Jorissen a vessel is internally subdivided by a piston into a lower compartment adapted to hold a supply of a fluent lubricant and an upper compartment. The lower side of the supply is formed with an outlet adapted to be connected via a conduit to a machine to be lubricated. The upper compartment is provided with an anode and cathode in an electrolyte so that when current passes between them the electrolyte generates gas and the piston is pushed down, pressurizing the lubricant in the lower compartment. Obviously this is a fairly complex device.

German patent document 3,811,469 filed 6 Apr. 1988 also by B. Jorissen describes another such system where the vessel containing the lubricant is fitted with a complete gas-generating cell comprising a compartment containing a reactive liquid and a cartridge defining a compartment containing an active-alloy metal that can react with the liquid to generate a gas. The cartridge is screwed into the cell to activate the chemical reaction and drive down a separate piston that is provided in the vessel. Once again this system is fairly complex.

OBJECTS OF THE INVENTION

It is therefore an object of the present invention to provide an improved automatic lubricant dispenser.

Another object is the provision of such an improved automatic lubricant dispenser which overcomes the above-given disadvantages, that is which is of relatively simple construction so that it can be a single-use throwaway item.

SUMMARY OF THE INVENTION

An automatic pressurizable lubricant dispenser has according to the invention a vessel adapted to hold a supply of a fluent lubricant and having one side formed with an outlet adapted to be connected via a conduit to a machine to be lubricated and another open side and a cover engaged over the other side and fitted with a cap fittable snugly like a piston in the vessel and forming with the cover a substantially closed compartment holding a supply of a reactive liquid. The cover is formed with a seat opening into the compartment. A gas-generating cartridge fits into the seat and has an element capable of reacting with the liquid and forming a gas. A removable partition closes the seat and segregates it from the liquid-holding compartment. The cartridge is constructed so as to remove the partition and contact the element with the liquid for generating gas in the compartment and forcing the cap like a piston away from the cover into the vessel to pressurize the fluent lubricant therein.

The cap therefore serves a double function, forming the compartment in the generator that holds the liquid, and subsequently acting as piston when the generator is activated. Thus with the instant invention the separate elastic membrane and piston of the prior art are replaced by a single element. When gas is generated, the cap separates from the cover and acts as a piston, since it is no longer needed in its prior function.

According to the invention the cover fits complementarily with the other side of the vessel and the cartridge fits complementarily into the seat of the cover. The cap has an elastomeric ring engaged releasably with a rim of the cover. The cartridge is threaded into the seat and forms a chamber closed by the partition and containing the element.

In accordance with the invention the partition is unitarily formed with the cover which itself is formed around the partition with a weakened region permitting the means to break out the partition to remove it. Screwthreads are provided in the seat so that when the cartridge is screwed into the seat it engages the partition and breaks it out. For ease of use, and to tell when the lubricant supply is exhausted, the vessel is made of a transparent synthetic resin. Both the cartridge and cover are made of a synthetic resin.

In a particularly effective embodiment the cartridge carries at least two arms engageable with the partition to break it out and pivotal on displacement into the seat between a retaining position holding the element and a position releasing the element. The arms are formed as two-armed levers pivoted on the cartridge for movement between the positions and each having a lower end engageable with the partition and holding the element in the retaining position and an upper end engageable with the seat on insertion of the cartridge into the seat to pivot into the releasing position. The upper ends of the arms have bumps engageable with the seat on insertion of the cartridge into the seat. On full insertion of the cartridge into the seat the lower ends of the arms project from the seat into the compartment.

BRIEF DESCRIPTION OF THE DRAWINGS

The above and other objects, features, and advantages will become more readily apparent from the following, reference being made to the accompanying drawing in which.

SPECIFIC DESCRIPTION

Figure 1:
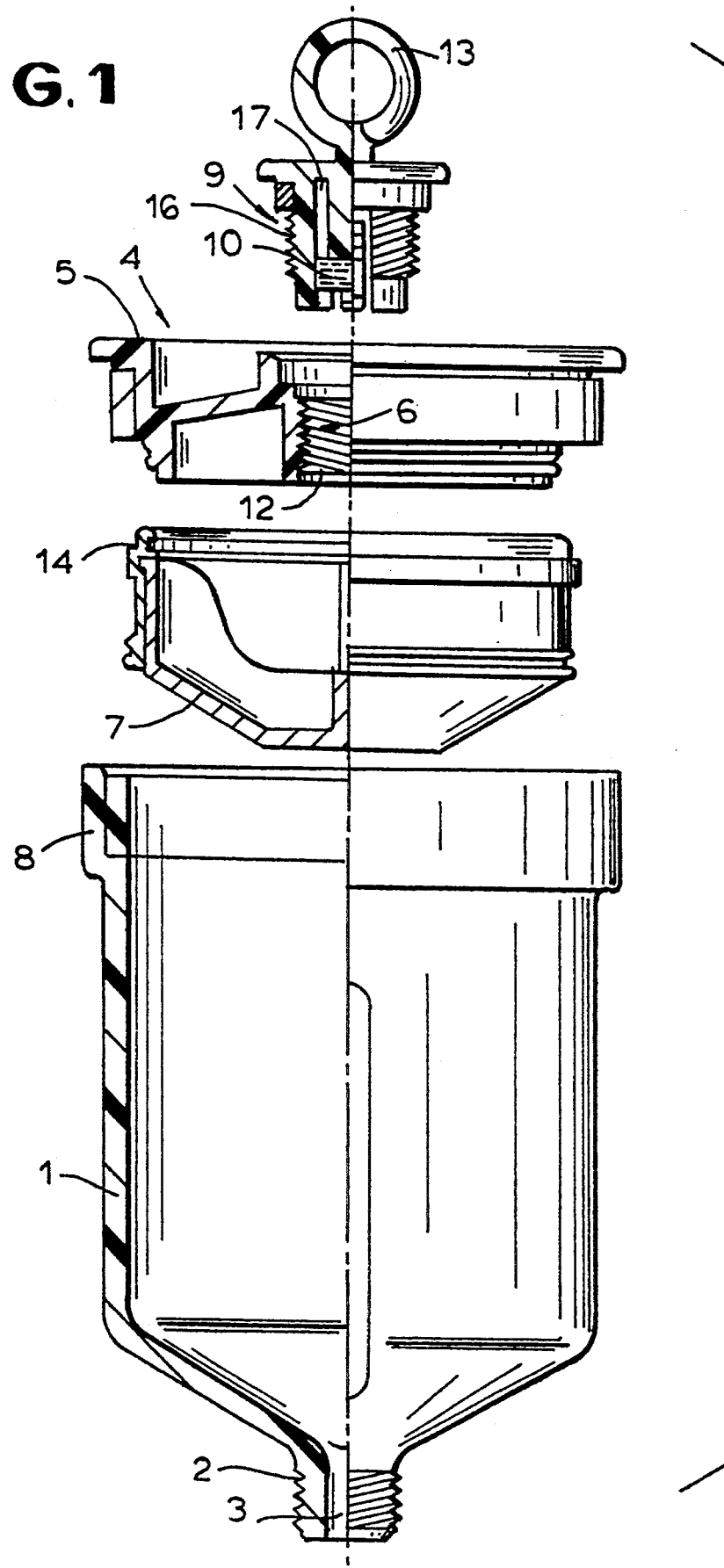
FIG. 1 is an exploded view partly in axial section through an automatic lubricant dispenser according to the invention.
Figure 2:
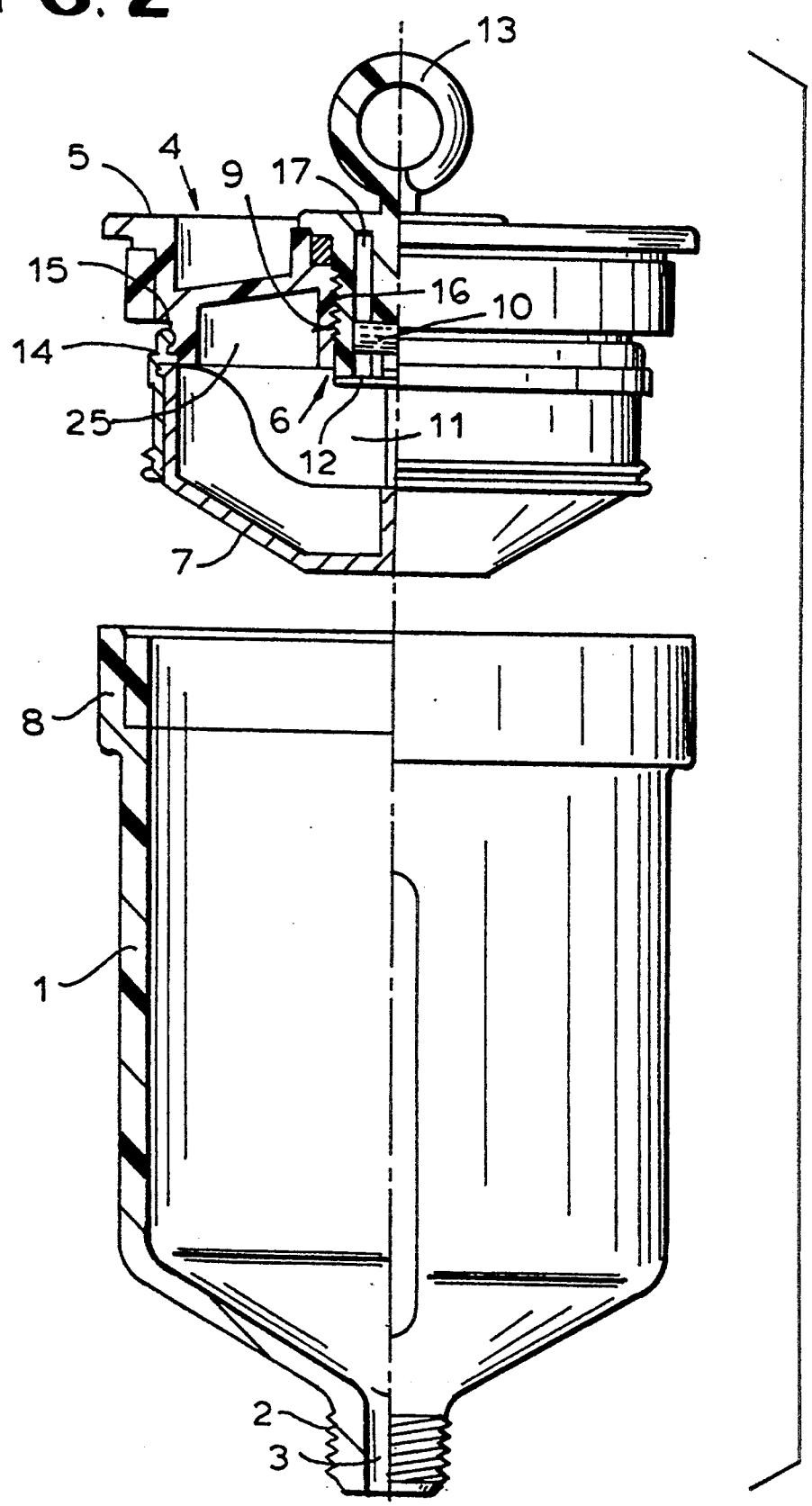
FIG. 2 is a view like FIG. 1 but with the dispenser only separated into its two main parts.

As seen in FIGS. 1 through 4 the lubricant dispenser according to the invention comprises a basically cylindrical vessel 1 centered on a normally upright axis A and having a lower end formed as an outlet nipple 2 defining an outlet opening 3 and normally connected via a conduit 23 to a machine 24 to be lubricated. The container 1 has an open upper end 8 formed with an internal screwthread receiving a top wall or cover 5 that forms part of a gas-generating cell 4 having a central threaded hole 6 into which fits a gas-generating cartridge 9 provided with an external screwthread 16 for holding it in place. A cup-shaped cap 7 that can act as a piston has a seal ring 14 that fits over a radially outwardly projecting annular ridge 15 formed on a lower edge of the cover 5.

The cartridge 9 is provided with a capsule 10 which, when contacted with a body 11 of liquid contained in a chamber 25 between the cover 5 and cap 7, generates gas in a manner well known in the art. A frangible or removable cover disk 12 contains the capsule 10 in a chamber 17 of the cartridge 9 to prevent it from contacting the liquid 11 prior to the desired activation time. An operating element 13 on the cartridge 9 can be actuated to pierce or strip off the cover disk 12 as shown in dot-dash lines in FIG. 3.

Figure 3:
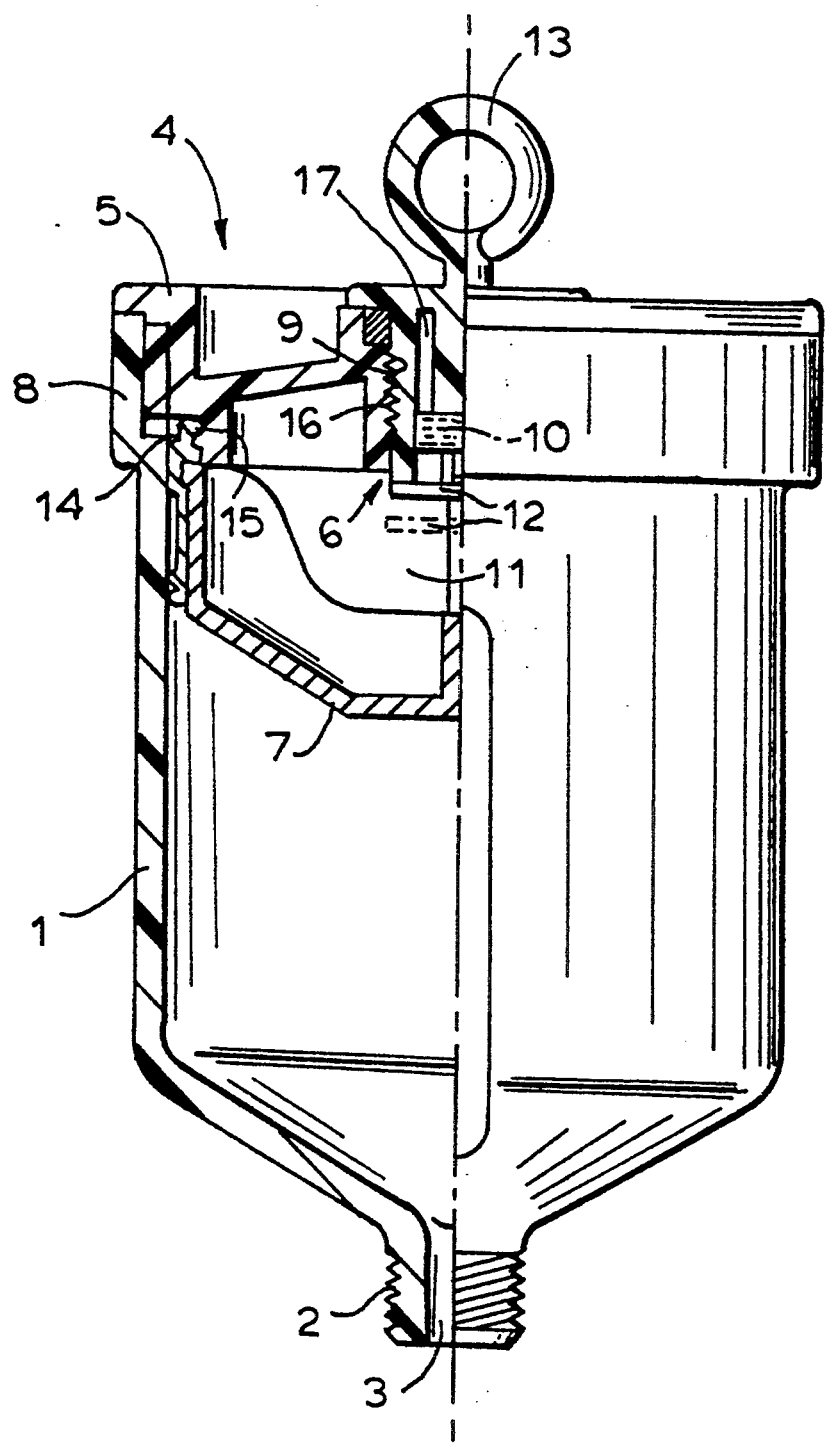
FIG. 3 is a view like FIG. 1 of the assembled dispenser prior to activation.
Figure 4:
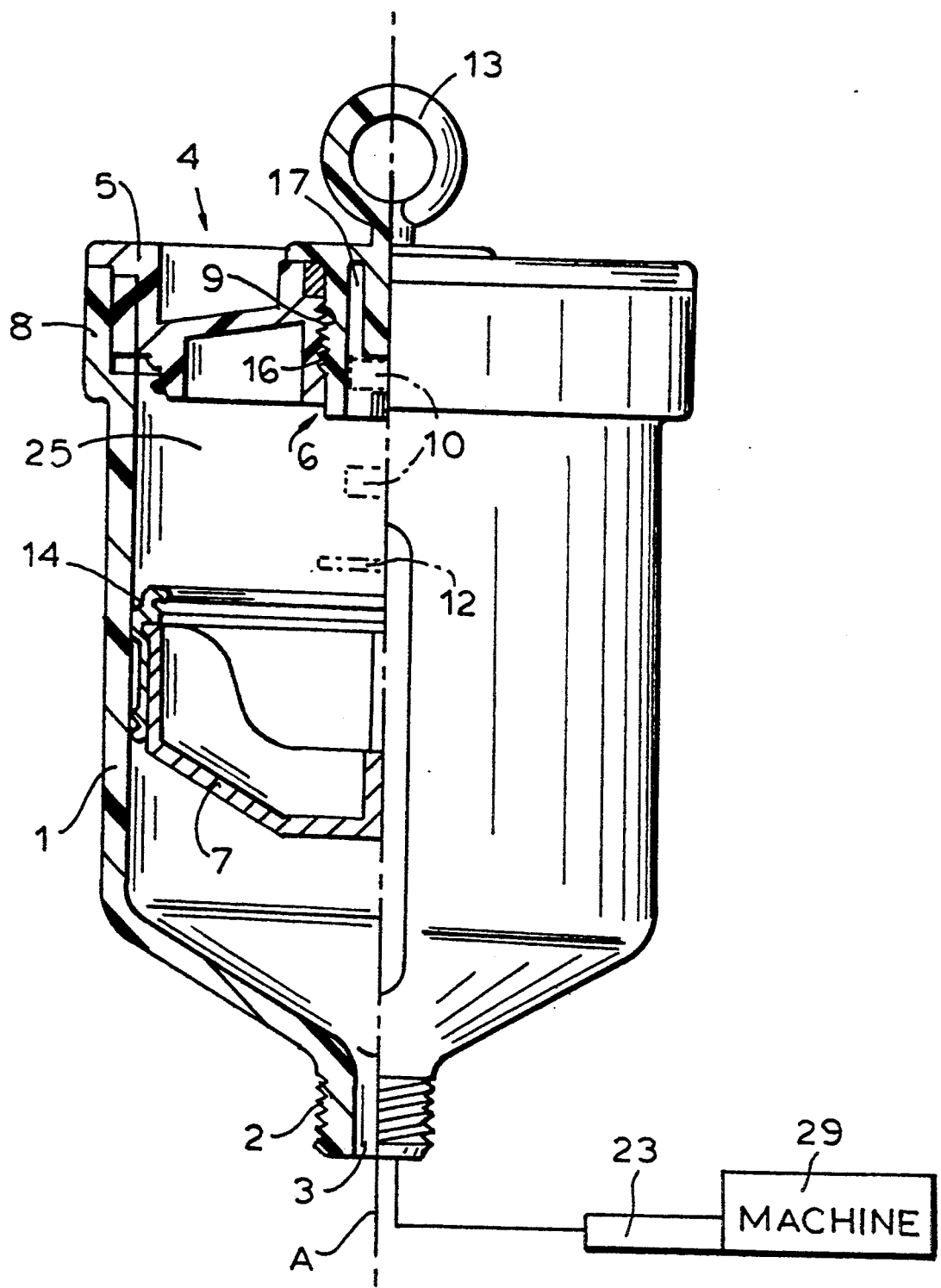
FIG. 4 is a view like FIG. 1 of the assembled dispenser after activation.

Thus the device can be stored indefinitely in the FIG. 3 position, with the capsule element 10 segregated in its compartment 17 by the membrane 12 from the liquid 11. To activate the device, the element 13 is actuated, thereby destroying or piercing the sheet 12 so that the liquid 11 and element 10 can react with each other, generating gas. This will build up pressure in the compartment 25 to force the cap 7 off the cover 5 downward in the vessel 1. The liquid lubricant stored in this vessel 1 is thereby put under pressure to flow along the conduit 23 to the machine 24.

Figure 5A:
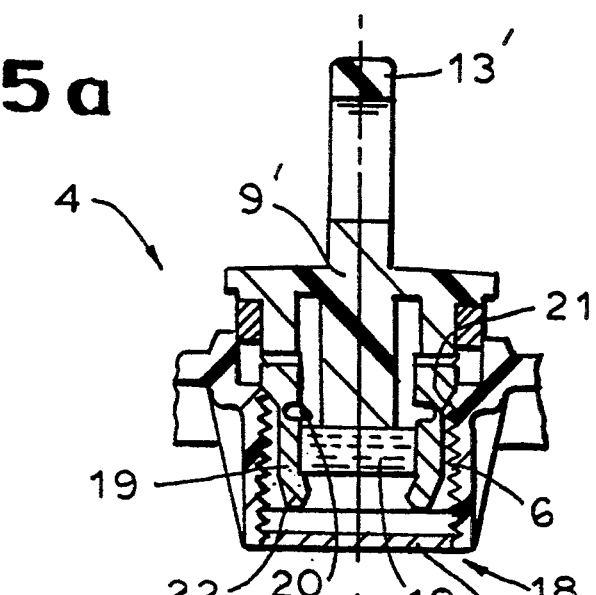
FIGS. 5a, 5b, and 5c are axial sections through a gas-generating cartridge according to the invention in successive steps of activation.
Figure 5B:
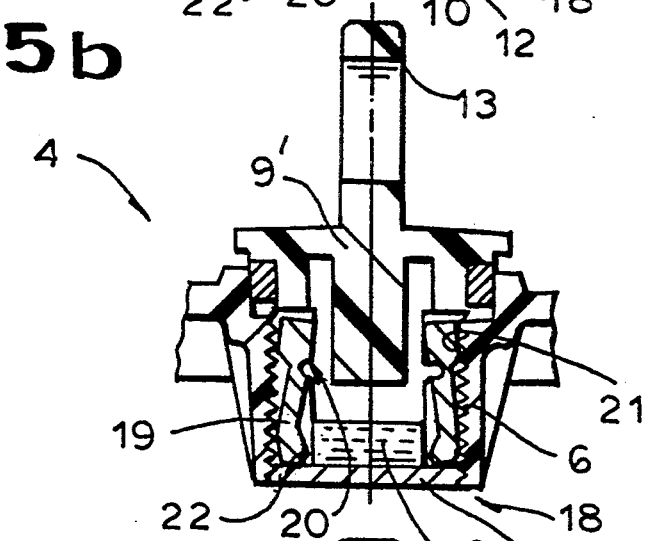
Figure 5C:
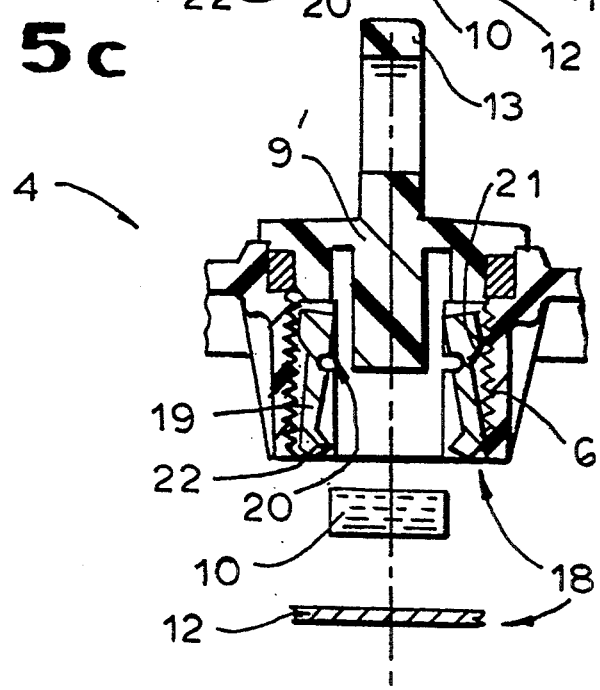

In the arrangement of FIGS. 5a through 5c, the cover membrane 12 is integrally formed with the cover 5 but surrounded by a weakened line or groove 18, forming a closure for the lower end of the threaded hole 6 into which the cartridge 9' is screwed. A plurality of arms 19 are pivoted at respective tangential axes 20 in the cartridge 9 and have inwardly turned lower ends 22 embracing and holding the element 10 and upper ends 21 that project outward. Thus when the cartridge 9 is screwed down in the cover hole 9, the lower ends 22 of the arms 19 first engage the membrane 12 as seen in FIG. 5b, then break it off at the weakened zone 18. Then as the upper ends 21 engage the wall of the bore 6, these lower ends 22 spread to drop the pellet 10 into the liquid 11 thereunder. Prior to activation the cartridge 9' can be partially screwed into the hole 6 so that all that is necessary to pressurize the dispenser is a few turns of its handle 13' to pressurize the chamber 25 and start controlled feed of the lubricant.

The principal parts—the vessel 1, cover 5, and cartridge body 9—can be produced from inexpensive cast plastic. Thus the cost of this device can be held fairly low.

I claim:

1. An automatic pressurizable lubricant dispenser comprising:

a vessel adapted to hold a supply of a fluent lubricant and having one side formed with an outlet adapted to be connected via a conduit to a machine to be lubricated and another open side;

a cover engaged over the other side;

a cap fittable like a piston in the vessel, releasably engaged with the cover, and forming with the cover a substantially closed compartment holding a supply of a reactive liquid, the cover being formed with a seat opening into the compartment;

a gas-generating cartridge fittable into the seat and having an element capable of reacting with the liquid and forming a gas;

a removable partition closing the seat and segregating it from the liquid-holding compartment; and means in the cartridge for removing the partition and contacting the element with the liquid for generating gas in the compartment and disattaching the cap from the cover and forcing the cap like a piston away from the cover into the vessel to pressurize the fluent lubricant therein.

2. The lubricant dispenser defined in claim 1 wherein the cover fits complementarily with the other side of the vessel.

3. The lubricant dispenser defined in claim 2 wherein the cartridge fits complementarily into the seat of the cover.

4. The lubricant dispenser defined in claim 3 wherein the cap has an elastomeric ring engaged releasably with a rim of the cover.

5. The lubricant dispenser defined in claim 1 wherein the cartridge is threaded into the seat and forms a chamber closed by the partition and containing the element.

6. The lubricant dispenser defined in claim 1 wherein the partition is unitarily formed with the cover.

7. The lubricant dispenser defined in claim 6 wherein the cover is formed around the partition with a weakened region permitting the means to break out the partition to remove it.

8. The lubricant dispenser defined in claim 7 wherein the means includes screwthreads in the seat, whereby when the cartridge is screwed into the seat the cartridge engages the partition and breaks it out.

9. The lubricant dispenser defined in claim 1 wherein the vessel is made of a transparent synthetic resin.

10. The lubricant dispenser defined in claim 1 wherein the cartridge and cover are made of a synthetic resin.

11. The lubricant dispenser defined in claim 1 wherein the means includes at least two arms on the cartridge engageable with the partition to break it out and pivotal on displacement into the seat between a retaining position holding the element and a position releasing the element.

12. The lubricant dispenser defined in claim 11 wherein the arms are formed as two-armed levers pivoted on the cartridge for movement between the positions and each having a lower end engageable with the partition and holding the element in the retaining position and an upper end engageable with the seat on insertion of the cartridge into the seat to pivot into the releasing position.

13. The lubricant dispenser defined in claim 12 wherein the upper ends of the arms have bumps engageable with the seat on insertion of the cartridge into the seat.

14. The lubricant dispenser defined in claim 12 wherein on full insertion of the cartridge into the seat the lower ends of the arms project from the seat into the compartment.

15. The lubricant dispenser defined in claim 12 wherein the partition is integrally formed with the cover and the cover is formed around the partition with a weakened region permitting the means to break out the partition to remove it.

16. An automatic pressurizable lubricant dispenser comprising:

- a generally cylindrical vessel adapted to hold a supply of a fluent lubricant and having one axial side formed with an outlet adapted to be connected via a conduit to a machine to be lubricated and an axially opposite open side;
- a cover fitted over the other side;
- a cap releasably attached to the cover, fittable like a piston in the vessel, and forming with the cover a substantially closed compartment holding a supply of a reactive liquid, the cover being formed with a threaded seat opening into the compartment;
- a gas-generating cartridge threadable into the seat and forming a compartment containing an element capable of reacting with the liquid and forming a gas;
- a frangible partition closing the seat and segregating the closed compartment of the cover from the liquid-holding compartment; and
- means in the cartridge for removing the partition and contacting the element with the liquid for generating gas in the compartment and disattaching the cap from the cover and forcing the cap like a piston axially away from the cover into the vessel to pressurize the fluent lubricant therein.

* * * * *